United States Patent [19]

Butz et al.

[11] Patent Number: 5,012,887
[45] Date of Patent: May 7, 1991

[54] DRIVE FOR MOTOR VEHICLES

[75] Inventors: Dieter Butz, Mannheim; Franz Erbach, Otterstadt; Kurt Müller, Lapmertheim, all of Fed. Rep. of Germany

[73] Assignee: Deere & Company, Moline, Ill.

[21] Appl. No.: 385,763

[22] Filed: Jul. 26, 1989

[30] Foreign Application Priority Data

Aug. 3, 1988 [DE] Fed. Rep. of Germany ....... 3826341

[51] Int. Cl.$^5$ .............................................. B60K 17/00
[52] U.S. Cl. ..................................... 180/305; 74/665 B
[58] Field of Search ...................... 180/305, 53.1, 53.2,
180/243, 244, 245, 377, 378, 379, 380; 74/665
A, 665 B, 15.4, 15.8, 15.6

[56] References Cited

U.S. PATENT DOCUMENTS

| 3,780,820 | 12/1973 | Schwab et al. | 180/243 |
| 3,855,878 | 12/1974 | Steiner | 74/665 Q |
| 4,262,768 | 4/1981 | Itatani et al. | 180/242 |
| 4,581,949 | 4/1986 | Mann et al. | 74/15.4 |

FOREIGN PATENT DOCUMENTS

| 0140046 | 5/1985 | European Pat. Off. . |
| 2163895 | 12/1971 | Fed. Rep. of Germany . |
| 1655584 | 4/1972 | Fed. Rep. of Germany . |
| 2160243 | 6/1973 | Fed. Rep. of Germany . |
| 2313784 | 8/1973 | Fed. Rep. of Germany . |
| 2313784 | 12/1973 | Fed. Rep. of Germany . |
| 2849125 | 8/1979 | Fed. Rep. of Germany . |
| 2900776 | 7/1980 | Fed. Rep. of Germany . |
| 2353768 | 12/1977 | France . |
| 8702895 | 2/1989 | Netherlands . |
| 8800053 | 6/1989 | Netherlands . |
| 1491964 | 11/1977 | United Kingdom . |
| 89/12188 | 12/1989 | World Int. Prop. O. . |

OTHER PUBLICATIONS

"Landtechnik" Article, Oct. 10, 1982.

*Primary Examiner*—Andres Kashnikow
*Assistant Examiner*—Richard Camby

[57] ABSTRACT

A stepless drive for vehicles, such as agricultural tractors, which must have a wide range of very low speeds is provided by a hydraulic drive which is selectively engageable in place of the conventional gearbox drive. The hydraulic drive shaft is selectively engageable with the drive shaft of the motor vehicle via a gear shift mechanism in an auxiliary gearbox. An electronic interlock assures that the hydraulic drive is engaged with the drive shaft only when the conventional gearbox drive is disengaged from the drive line, and vice versa.

14 Claims, 3 Drawing Sheets

DRIVE FOR MOTOR VEHICLES

BACKGROUND OF THE INVENTION

1. Field of The Invention

The present invention concerns a drive for a motor vehicle, and particularly for a tractor with an internal combustion engine and at least one attached gearbox having a drive shaft to drive the front and/or rear wheels.

2. Description of the Related Art

Gearboxes are frequently used in motor vehicles with internal combustion engines to allow varying speeds with optimum power output. Supplemental gearboxes, such as auxiliary transmissions and creeper gearboxes, are in use today in addition to primary shifted gearboxes to provide extremely high ratios of operating speeds, as may be required, for example, in agricultural vehicles.

In agricultural tractors in particular, an extremely slow drive often is needed, for example, in planting, which may require several speeds between 0 and 2 km/hour. For such slow speeds, creeper gearboxes are used. Unfortunately, due to the relatively low rotational speeds involved, relatively large torques are developed, so that the creeper gearboxes must be relatively large, which is costly. In addition, conventional gearboxes, including supplemental and creeper gearboxes, have the peculiarity that a stepless drive is not possible over large speed ranges. Furthermore, speeds that vary only slightly from 0 can be obtained only by slipping the clutch.

SUMMARY OF THE INVENTION

Accordingly, it is the object of the present invention to create a drive for a motor vehicle that allows stepless operation between a full stop and a relatively low vehicle speed by supplementing the usual drive components in the drive line. The supplement to the drive should essentially be made possible by a low cost add-on or over-haul kit.

This object is achieved according to the present invention by providing a hydraulic motor whose output shaft can be connected to the drive shaft of the vehicle. The hydraulic motor to be inserted into the driveline can be adjusted without steps over a speed range that lies between reverse and forward drive. Speeds can be provided that vary only slightly from a standstill of the vehicle. In addition, the structure does not require a major intrusion into the driveline of the vehicle to install the hydraulic motor into a previously completed vehicle.

In the preferred embodiment, the drive shaft carries a gear that can be brought into engagement with a gear driven by the hydraulic motor. In an alternative embodiment, the change to the driveline consists merely of adding a gear to the drive shaft. The hydraulic motor then can be attached to the vehicle chassis in the vicinity of this gear.

To save power and prevent damage to the driveline components, it is appropriate to disengage the hydraulic motor from the driveline when the vehicle is driven directly by the gearbox. For this purpose, an axially movable gear can be arranged on the drive shaft where it can be shifted into engagement with the gear teeth of the hydraulic drive. This object can be achieved with a simple clash-type shift, but this will not permit shifting in the presence of a residual load, since the gears will clash under those conditions. Likewise, shifting may not be possible at standstill if the faces of the gear teeth are pressing against one another.

To avoid such shifting problems, the preferred embodiment provides an auxiliary gearbox arrangement using a shift sleeve for the connection between the hydraulic motor and the vehicle drive shaft. This makes shifting possible while at standstill or under a residual load. Chamfering the ends of the gear teeth on the face of the gear to be engaged will further avoid any problems in shifting.

In the preferred configuration, the drive shaft carries a concentric gear which is fixed to rotate with the drive shaft, but which is axially movable and configured as a shift sleeve. This shift sleeve gear can engage a set of gear teeth of an axially slidable gear which is supported by a bearing on the drive shaft, free to rotate and engaged by sliding axially. The axially slidable gear includes a second set of gear teeth which are driven by the hydraulic motor, as described below. Alternatively, a gear could be rigidly attached to the drive shaft instead of using an axially slidable gear, and an axially movable shift sleeve could engage this gear to obtain the desirable result. In a further alternative, a more comfortable but also more costly mechanism would engage the hydraulic motor with the drive shaft by means of a multiple disk clutch In the preferred embodiment, the hydraulic motor is attached to the hydraulic drive housing. It is equipped with an output shaft that is splined or otherwise carries a gear and extends into the interior of the hydraulic drive housing. This output shaft is surrounded by a hollow gear shaft, which is internally splined to mesh with the splines of the hydraulic motor output shaft. The outside of the hollow gear shaft carries an external gear or splines which engage the second gear teeth of the axially slidable gear described above, thereby providing power to the auxiliary gear box. The hollow gear shaft is supported in bearings in the hydraulic drive housing, which has the advantage of providing a fully supported overhung shaft.

A particularly advantageous configuration for the present invention uses a two-part drive shaft which is interrupted in the vicinity of the hydraulic drive. To assure power transmission, the ends of the two shaft parts may be splined together, with one part carrying external splines which engage internal splines in a corresponding recess in the other part. This meshed spline arrangement permits the shaft ends to slide axially with respect to each other, which improves the ease of installation. The hydraulic drive then can be configured as a complete assembly, which includes a segment of the drive shaft. To apply this retrofit kit to an already completed vehicle, it then is necessary only to replace the existing drive shaft with a shortened drive shaft and to insert the partial shaft segments of the kit into the driveline.

The hydraulic drive preferably is placed in the vicinity of the output of the clutch housing for the main gearbox. For this purpose, two intermediate braces preferably are located axially one behind the other between the hydraulic housing and the clutch housing. The intermediate braces provide for adjustment of the axial play of the bearings of the bearings, preferably tapered roller bearings, of the hydraulic drive housing on the drive shaft of the vehicle. The first intermediate brace is used to adjust the tapered roller bearing in the direction of the clutch housing, while the second intermediate brace provides axial adjustment of the tapered roller bearing toward the hydraulic drive housing.

To eliminate unnecessary power losses and stresses in materials, only one of the two drive arrangements (direct gearbox drive or hydraulic drive) should be engaged to drive the vehicle at any given time. This goal can be obtained by using an electronically controlled interlock. Hence it is desirable that the engagement of the gear teeth of the shift sleeve or multiple disk clutch be actuated by electronic control signals.

Accordingly, a preferred embodiment of the invention provides that the gear teeth of the drive shaft, the shift sleeve or the multiple disk clutch (whichever is used), be connected by a linkage to a shift cylinder. The shift cylinder in turn is actuated by hydraulic fluid from an electrohydraulic valve.

Use of the present invention is particularly advantageous with vehicles that already are equipped with a hydraulic system. There, the present hydraulic motor can be supplied by a previously existing high pressure hydraulic circuit and the shift cylinder supplied by a previously existing low pressure hydraulic circuit. Both circuits usually are present in tractors, with the high pressure circuit used to operate agricultural equipment and the low pressure circuit used for lubrication and control.

To ensure reliable operation, a number of preferred characteristics of a controlled circuit are utilized:

The hydraulic drive is biased out of engagement, so that the hydraulic drive operates only after a specific control signal is provided, i.e., one indicating that the hydraulic motor is to provide power and that the gears between the hydraulic motor and the drive shaft should be engaged. In case of electrical cable breakage or other failures, the hydraulic drive will not be engaged.

In the preferred embodiment, the power output of the hydraulic drive is adjusted by an electronically controlled proportioning valve, with the proportioning valve returning to its rest position in the absence of an electronic control signal. With the valve in its rest position, no hydraulic pressure is supplied to the hydraulic motor. Adjustment of the proportioning valve can be performed by a potentiometer, with the potentiometer calibrated so that the hydraulic motor delivers no power when the potentiometer is in its zero position.

The electronic control circuit is interlocked in such a way that the hydraulic drive cannot operate at any time that a gear of the shift gearbox is engaged. This will avoid having both the gearbox and hydraulic drive acting upon the driveline.

The electronic control circuit is also provided with an interlock that stops the hydraulic drive upon application of a brake. This interlock is appropriate to avoid having to have the brakes overcome the high torque of the hydraulic drive.

An additional interlock of the control circuit prevents the hydraulic drive from being operated after disengaging a gear or after application of the brake, until after the electronic control signal is brought to zero. This assures that the hydraulic drive will not apply power to the drive shaft after disengagement of the shift gearbox, so that the vehicle will not continue to operate unintentionally on the hydraulic drive.

Finally, in order to avoid unintended operation of the hydraulic drive, an interlock is provided which permits operation of the vehicle by means of the ignition switch only if the hydraulic drive is not engaged with the driveline of the vehicle.

BRIEF DESCRIPTION OF THE DRAWINGS

The invention will now be described in further detail with reference to the following drawings.

DETAILED DESCRIPTION OF THE PREFERRED EMBODIMENT

Figure 1:
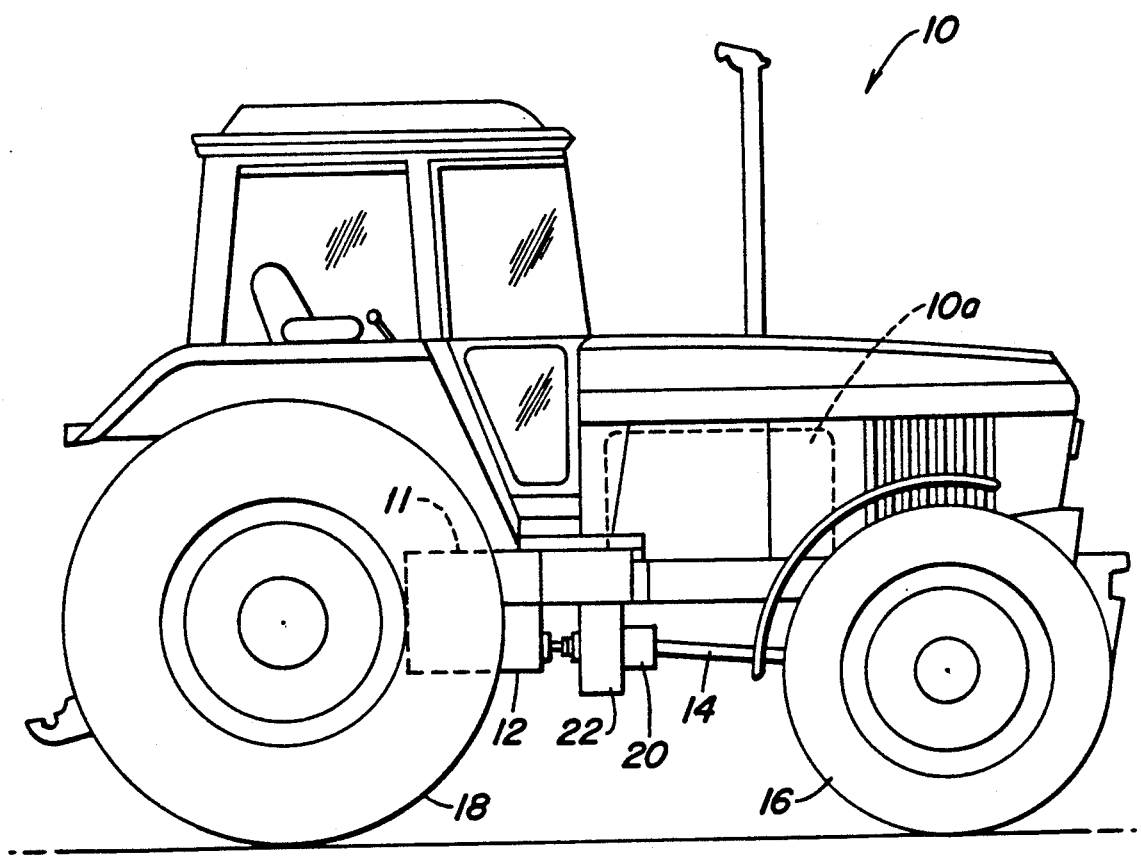
FIG. 1 shows a schematic arrangement of an agricultural tractor with a drive according to the present invention.

FIG. 1 shows a schematic outline of an agricultural tractor 10, with a drive that includes an internal combustion engine 10a, a shift gearbox 11, a clutch and a clutch housing 12, a drive shaft 14, front wheels 16 and rear wheels 18. The present hydraulic motor 20 and auxiliary gearbox/hydraulic drive housing 22 are shown with the drive shaft 14 below the tractor chassis.

Figure 2:
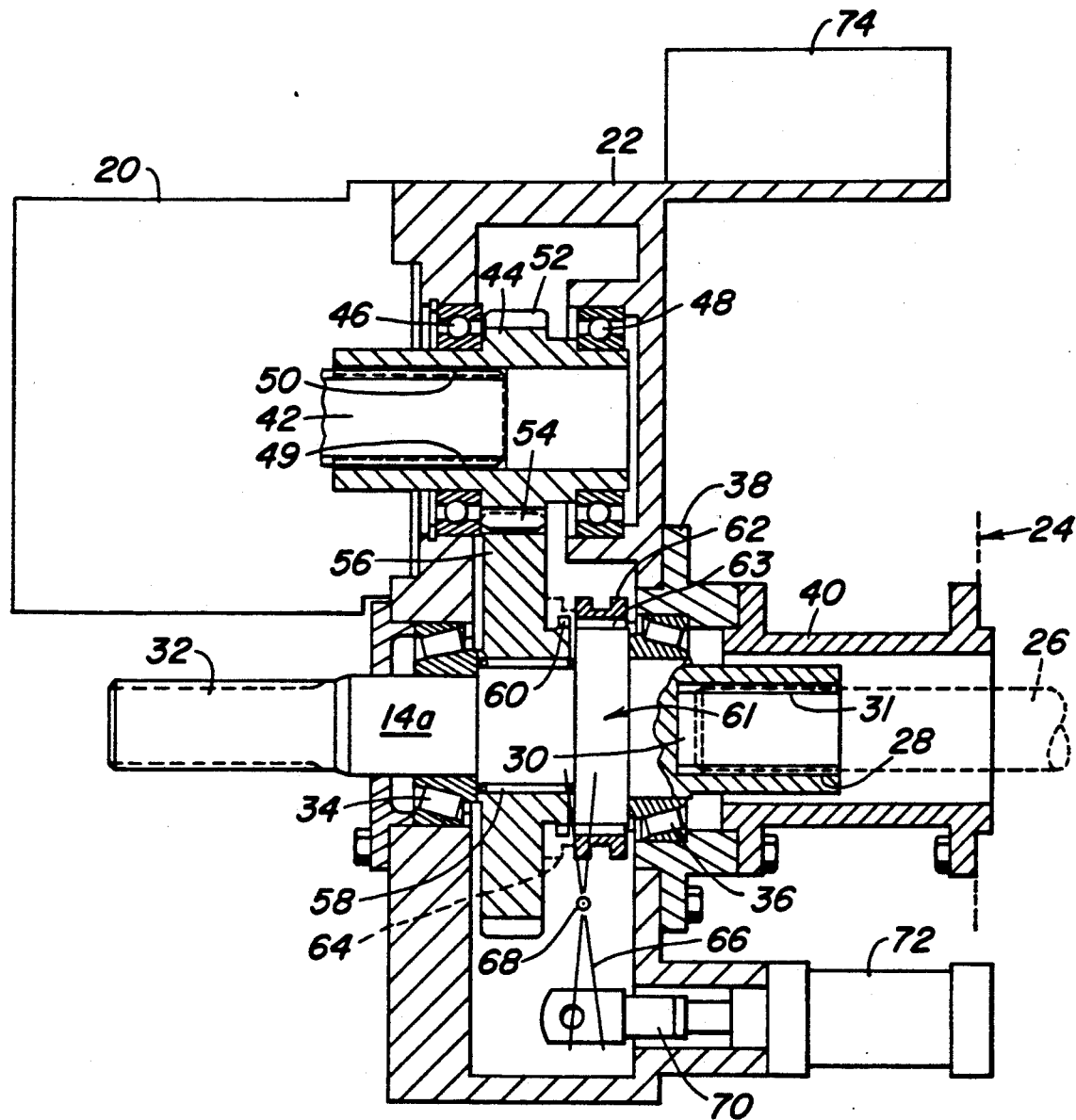
FIG. 2 shows a hydraulic drive according to the present invention.

As can be seen in FIG. 2, the drive shaft part 14a of the tractor 10 has multiple parts. FIG. 2 shows a dashed outline 24 of the clutch housing 12 from which a part of the output shaft 26 of the clutch protrudes, also shown in dashed lines. The end of the output shaft 26 has an external gear with axial
teeth or splines 28. The splines 28 on the output shaft 26 engage a recess 30 in the face of the drive shaft part 14a. Splines 31 formed in the inner surface of the recess 30 mesh with the splines 28 of the output shaft 26, allowing shafts 14a and 26 to move axially with respect to each other. The free end 32 of the drive shaft part 14a can be connected with the articulated shaft 14 (not shown in FIG. 2, but visible in FIG. 1), which leads to the front wheel 16.

The drive shaft part 14a is supported in tapered roller bearings 34, 36 in the hydraulic drive housing 22, which in turn is mounted on the tractor chassis. The hydraulic drive housing 22 also is connected to the clutch housing 12 by two intermediate braces 38, 40. The intermediate braces 38, 40 are used to adjust the axial play of the tapered roller bearings 34, 36. The hydraulic motor 20 is mounted on a flange on the hydraulic drive housing 22, with its output shaft 42 extending into the interior of the hydraulic drive housing 22.

The drive shaft 42 of the hydraulic motor 20 extends into the interior of the hollow gear shaft 44, which is supported in the hydraulic drive housing 22 by two ball bearings 46, 48, with its axis parallel to the axis of the drive shaft part 14a. The end of the drive shaft 42 of the hydraulic motor 20 has splines 49 which mesh with corresponding splines 50 formed in the inside of the hollow gear shaft 44.

The outside of the hollow gear shaft 44 carries or is formed into an external gear 52. The gear 52 engages the gear teeth 54 of a gear 56 which is supported on needle bearing 58, so as to be free to rotate about the drive shaft part 14a. The gear 56 includes an additional set of gear teeth 60 which forms part of the shift sleeve gearbox 61.

The shift sleeve 62 of the shift sleeve gearbox 6 includes internal splines 63 which fix the shift sleeve 62 against rotation relative to the drive shaft part 14a, but allow it to move axially relative to the drive shaft part 14a.

FIG. 2 shows the shift sleeve 62 in its disengaged position. Movement of the shift sleeve 62 to the dashed line position 64 provides a positive engagement between the splines 63 of the shift sleeve 64 and the additional set of gear teeth 60 on the gear 56. As a result, there is positive engagement between the hydraulic motor 20 and the drive shaft part 14a by way of the output shaft 42, the splines 49, 50, the external gear 62, the gear teeth 54, 60, and the splines 63.

Axial shifting of the shift sleeve 62 is accomplished by a linkage 66, which is indicated merely by dot-dash lines for clarity of illustration. A conventional shift fork may be conveniently employed. The linkage 66 pivots about the center 68. The free end of the linkage 66 opposite the shift sleeve 62 is connected, free to swivel, with piston rod 70 of a shift cylinder 72. Axial motion of the piston rod 70 in the shift cylinder 72 will swing the linkage 66 about the center 68, and thereby shift the shift sleeve 62 axially on the drive shaft part 14a.

The shift cylinder 72 is mounted on the hydraulic drive housing 22. In addition, an electrohydraulic valve 74 is mounted on the hydraulic drive housing 22 to control the shift cylinder 72.

Figure 3:
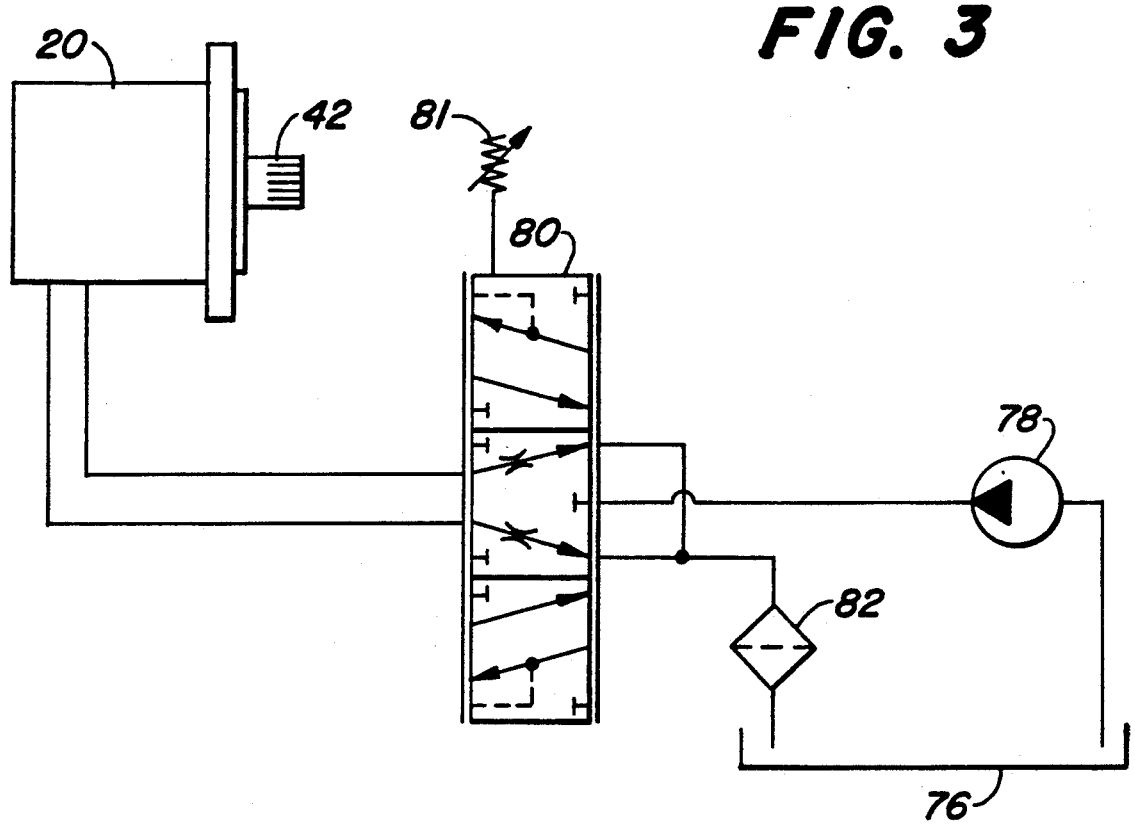
FIG. 3 shows a hydraulic supply circuit for the hydraulic motor of the present invention.

FIG. 3 illustrates the preferred hydraulic circuit for the hydraulic motor 20. Hydraulic oil is drawn from the reservoir 76 by a hydraulic pump 78 and is supplied to the hydraulic motor 20 by way of the hydraulic valve 80. It is returned by a return line by way of the hydraulic valve 80 through a filter 82 to the reservoir 76.

The hydraulic valve 80 is a continuously variable fourway, three-position proportioning valve. In the center position, both hydraulic lines of the hydraulic motor 20 are connected to the reservoir 76. The two outer positions of hydraulic valve 80 connect the reservoir 76 and pump 78 to the hydraulic motor 20 in opposite directions, so that in one position the motor will turn clockwise and in the other position the motor will turn counter-clockwise. Adjustment of the position of the electrohydraulic valve 80 is accomplished by a potentiometer 81 which can be moved in both directions from a zero position. The output shaft speed of the hydraulic motor can be controlled by a corresponding position of the potentiometer and valve.

Figure 4:
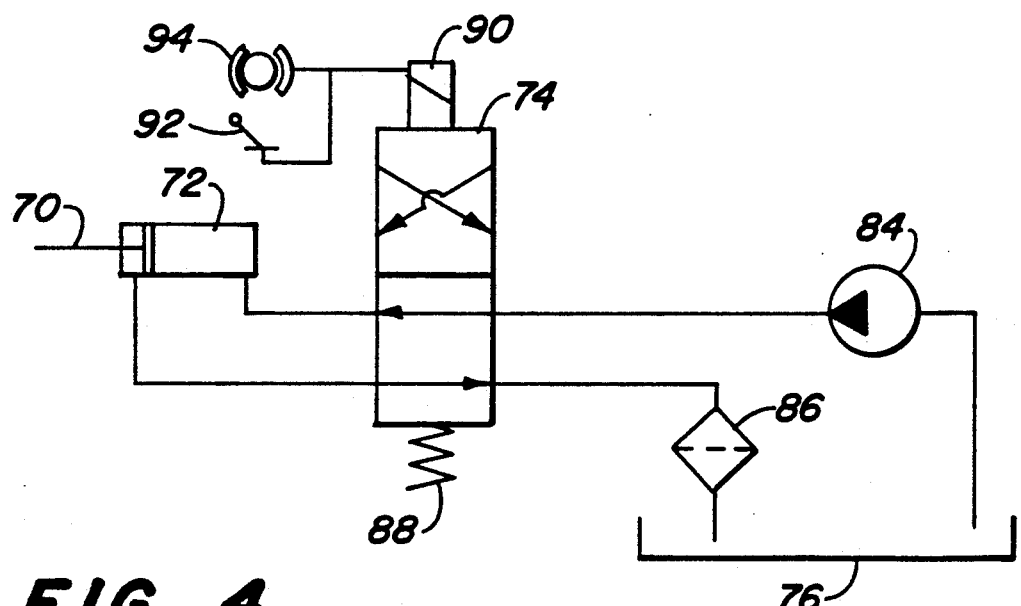
FIG. 4 shows a hydraulic control circuit for the hydraulic shift cylinder of the present invention.

FIG. 4 illustrates the preferred hydraulic control circuit for the shift cylinder 72. Here again, hydraulic oil is drawn from the reservoir 76 and forced by a hydraulic pump 84 via an electrohydraulic valve 74 to one chamber of the shift cylinder 72. The other chamber of the shift cylinder 72 is connected via the electrohydraulic valve 74 and a filter 86 to the reservoir 76. The valve 74 is a four-way, two-position valve which is pre-loaded to the rest position shown in FIG. 4, e.g., by a spring 88. In this rest position, the piston rod 70 of the shift cylinder 72 is moved to the left in the sense of FIG. 4, so that the sleeve 62 of the hydraulic drive is moved by the linkage 66 to the right in the sense of FIG. 2, thereby disengaging the hydraulic drive from the drive shaft part 14a. Upon energization of the magnetic coil 90 of the hydraulic valve 74, the valve position is changed so that hydraulic oil is forced into the other chamber of the shift cylinder 72. This moves the piston rod 70 to the right, which engages the shift sleeve 62 with the gear 60, thereby engaging the hydraulic drive with the drive shaft part 14a.

The hydraulic pumps 78 and 84 shown in FIGS. 3 and 4 are hydraulic pumps that typically already are present in a tractor 10. The hydraulic pump 78 used to supply the hydraulic motor 20 is the high-pressure pump that is used in the tractor 10 to supply agricultural equipment. This high-pressure pump provides, for example, a pressure of 190 Bar. The hydraulic pump 84 that supplies the shift cylinder 72 is the low-pressure pump of the tractor that supplies the hydraulic control circuits. This low pressure pump provides, for example, a pressure of 10 Bar. Hydraulic pressure to operate the shift cylinder 72 could also be taken from the high-pressure circuit, as long as a pressure reduction valve or the like is provided. In this case, the low-pressure hydraulic pump 84 can be eliminated.

When a gear is engaged via the gear shift 92, or the brake 94 is applied, a signal is sent to break the electronic circuit to the magnetic coil 90, so that the hydraulic valve 74 is moved to its rest position by the force of the spring 88. The result is the hydraulic drive is disengaged from the drive shaft.

While the invention has been described in conjunction with a specific embodiment, it is to be understood that many alternatives, modifications and variations will be apparent to those skilled in the art in light of the foregoing description. Accordingly, this description of the invention is intended to embrace all such alternatives, modifications and variations which fall within the spirit and scope of the appended claims.

We claim:

1. A drive for a motor vehicle having a power source and at least one set of wheels, comprising:
    a drive shaft for driving the wheels;
    a shiftable gearbox selectively connectible between said drive shaft and the power source to drive said wheels;
    hydraulic power means having an output shaft selectively connectible between said drive shaft and said power source to drive said wheels;
    connection means for selectively connecting one, but not both, of said shiftable gearbox and said hydraulic power means to said drive shaft and said power source, said connection means including a drive shaft gear splined to said drive shaft for rotation therewith but axially slidable relative thereto, the splines of said drive shaft gear also being drivingly connected to said hydraulic power means output shaft when axially shifted in one direction and disconnected therefrom when axially shifted in the other direction, and said connection means further including an intermediate gear rotatably mounted about said drive shaft and having a first and a second set of gear teeth thereon, said first set of teeth being selectively engagable by the splines of said drive shaft gear and said second set of teeth being driven by said hydraulic power means output shaft; and
    an auxiliary gearbox housing having said hydraulic power means mounted thereto and said drive shaft gear, shift sleeve and intermediate gear mounted therein.

2. The drive of claim 1, further comprising a proportional electrohydraulic valve and an electronic circuit for controlling said proportional valve to control the amount and direction of flow of pressurized fluid to said hydraulic power means, said proportional valve including means for biasing the valve to a position such that no fluid is provided to aid hydraulic power means in the absence of a signal to the proportional valve.

3. The drive of claim 1, wherein said drive shaft is formed in two parts, one of which is provided with a splined recess for receiving a splined end of the other.

4. The drive of claim 1, wherein said connection means further comprises a shift sleeve for moving said drive shaft gear to connect and disconnect said splines from said hydraulic power means output shaft.

5. The drive of claim 1, further comprising two intermediate braces positioned between said shaftable transmission gearbox and said auxiliary gearbox housing to fix their relative positions.

6. The drive of claim 1, wherein said connection means further comprises a hollow shaft rotatably mounted in said auxiliary gearbox housing parallel to said intermediate gear, said hollow shaft having splines formed on the inside thereof which are engageable with said output shaft and a gear formed on the outside thereof which is engageable with said second set teeth of said intermediate gear.

7. A drive for a motor vehicle having a power source and at least one set of wheels, comprising:
 a drive shaft for driving the wheels;
 a shiftable gearbox selectively connectible between said drive shaft and the power source to drive said wheels;
 hydraulic power means having an output shaft selectively connectible between said drive shaft and said power source to drive said wheels; and
 connection means for selectively connecting one, but not both, of said drive shiftable gearbox and said hydraulic power means to said drive shaft and said power source, said connection means including a drive shaft gear splined to said drive shaft for rotation therewith but axially slidable relative thereto, the splines of said drive shaft gear also being drivingly connected to said hydraulic power means output shaft when axially shifted in one direction and disconnected therefrom when axially shifted in the other direction, wherein said connection means further comprises:
 a shift sleeve for moving said drive shaft gear to connect and disconnect said splines from said hydraulic power means output shaft;
 a shift linkage connected to move said shift sleeve;
 a hydraulic shift cylinder connected to move said shift linkage;
 a source of pressurized hydraulic fluid; and
 an electrohydraulic control valve for regulating the flow of pressurized hydraulic fluid from said source to said shift cylinder.

8. The drive of claim 7, wherein the motor vehicle has high pressure and low pressure hydraulic circuits, and wherein said hydraulic power means is supplied by said high pressure circuit and said low pressure circuit comprises said source of pressurized hydraulic fluid supplying said shift cylinder.

9. The drive of claim 8, wherein said control valve and said shift cylinder are biased to interrupt the hydraulic pressure to said shift cylinder and disengage said hydraulic power means from said drive shaft in the absence of a control signal to said control valve.

10. The drive of claim 8, wherein said connection means further comprises an electronic control circuit for controlling said control valve.

11. The drive of claim 10, wherein said electronic control circuit further comprises means for disconnecting said hydraulic power means from said drive shaft at any time that a gear of the shiftable gearbox transmission is connected to said drive shaft.

12. The drive of claim 10, wherein said vehicle includes at least one brake and wherein said electronic control circuit further comprises means for disconnecting said hydraulic power means from said drive shaft upon actuation of said at least one brake.

13. The drive of claim 10, wherein said electronic control circuit further comprises means for preventing connection of said hydraulic drive to said drive shaft after a gear of said shiftable gearbox transmission is disengaged or a brake is actuated until after the electronic control signal has been brought to zero.

14. The drive of claim 10, wherein said vehicle includes an ignition switch to start said power source and said electronic control circuit further comprises means for preventing said ignition switch from starting said power source whenever said hydraulic power means is connected to said drive shaft.

* * * * *